United States Patent
Teboulle (10) Patent No.: US 11,150,119 B2
(45) Date of Patent: *Oct. 19, 2021

(54) METHOD FOR MEASURING A SPEED OF A FLUID

(71) Applicant: SAGEMCOM ENERGY & TELECOM SAS, Rueil-Malmaison (FR)

(72) Inventor: Henri Teboulle, Rueil-Malmaison (FR)

(73) Assignee: SAGEMCOM ENERGY & TELECOM SAS, Rueil Malmaison (FR)

(*) Notice: Subject to any disclaimer, the term of this patent is extended or adjusted under 35 U.S.C. 154(b) by 108 days.

This patent is subject to a terminal disclaimer.

(21) Appl. No.: 16/488,171

(22) PCT Filed: Feb. 22, 2018

(86) PCT No.: PCT/EP2018/054451
§ 371 (c)(1),
(2) Date: Aug. 22, 2019

(87) PCT Pub. No.: WO2018/162250
PCT Pub. Date: Sep. 13, 2018

(65) Prior Publication Data
US 2020/0173823 A1 Jun. 4, 2020

(30) Foreign Application Priority Data
Mar. 10, 2017 (FR) ...................... 17 51990

(51) Int. Cl.
*G01F 1/66* (2006.01)
*G01D 4/02* (2006.01)
*G01P 5/24* (2006.01)

(52) U.S. Cl.
CPC ................ *G01F 1/66* (2013.01); *G01D 4/02* (2013.01); *G01P 5/245* (2013.01)

(58) Field of Classification Search
CPC ..... G01F 1/66–668; G01D 4/02; G01P 5/245; G01P 5/248
See application file for complete search history.

(56) References Cited

U.S. PATENT DOCUMENTS 7,775,125 B2 * 8/2010 Rhodes ............... G01F 25/0007
73/861.27
7,991,510 B2 * 8/2011 Duan ...................... G01P 5/247
700/282

(Continued)

FOREIGN PATENT DOCUMENTS

| EP | 0 218 293 A1 | 4/1987 |
| EP | 2 605 225 A1 | 6/2013 |
| JP | 2003-302416 A | 10/2003 |

*Primary Examiner* — Justin N Olamit
(74) *Attorney, Agent, or Firm* — Muncy, Geissler, Olds & Lowe, P.C.

(57) ABSTRACT

A method for measuring a speed of a fluid, comprising measurement phases and detection phases each carried out between two measurement phases, each detection phase comprising the steps of; measuring a spurious ultrasonic signal level; comparing the spurious ultrasonic signal level with a detection threshold capable of assuming a plurality of predefined values; if the measured spurious ultrasonic signal level is less than the detection threshold, reducing the detection threshold, and repeating the measurement step and the comparison step; when the measured spurious ultrasonic signal level becomes greater than or equal to the detection threshold, detecting a disturbance and, depending on the value of the detection threshold, determining if the disturbance originates from an anomaly or from attempted fraudulent activity.

14 Claims, 5 Drawing Sheets

(56) References Cited

U.S. PATENT DOCUMENTS

| | | | |
|---|---|---|---|
| 9,347,242 B2* | 5/2016 | Cregg | H04L 12/2803 |
| 9,665,536 B2* | 5/2017 | Brusilovsky | G01F 15/065 |
| 2014/0012518 A1 | 1/2014 | Ramamurthy et al. | |

* cited by examiner

METHOD FOR MEASURING A SPEED OF A FLUID

The invention relates to the field of methods of measuring a fluid speed.

BACKGROUND OF THE INVENTION

In order to measure a flow rate of a fluid flowing in a pipe, an ultrasonic flow meter conventionally makes use of a device for measuring the speed of the fluid by emitting and receiving ultrasound measurement signals.

Such a measurement device comprises a duct connected to the pipe in which the fluid flows. In order to measure the speed of the fluid, an ultrasound measurement signal is emitted into the duct to follow a path of defined length, the travel times taken by the ultrasound measurement signal to travel along the path of defined length both from upstream to downstream and from downstream to upstream are measured, and the speed of the fluid is estimated on the basis in particular of the defined length and of the difference between the travel times.

For water meters, three main types of measurement device are in use.

Figure 1:
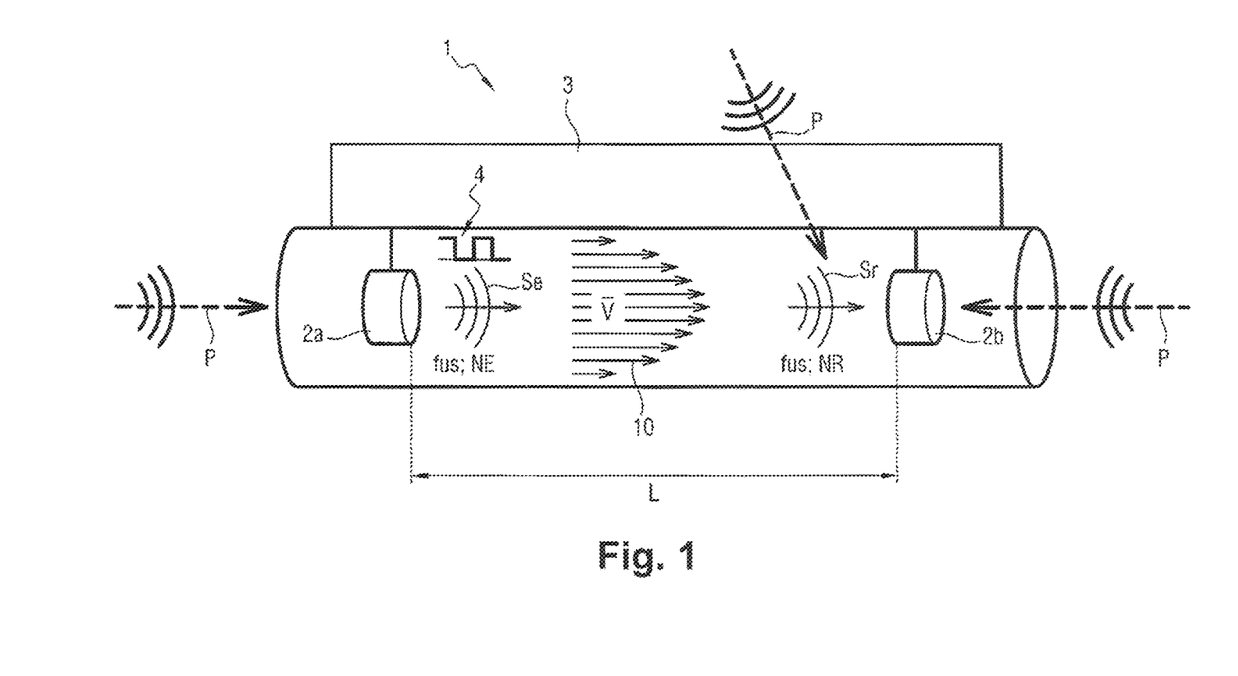
FIG. 1 shows an ultrasonic measuring device of a first type.

A first type of measurement device 1, sometimes referred to as a "classical pipe" device, is shown in FIG. 1. The first type of measurement device 1 comprises a first transducer 2a, a second transducer 2b, and a measurement module 3 connected to the first transducer 2a and to the second transducer 2b.

The first transducer 2a and the second transducer 2b are paired. By way of example, the first transducer 2a and the second transducer 2b are piezoelectric transducers.

The path of defined length is thus a rectilinear path of length L between the first transducer 2a and the second transducer 2b.

The first transducer 2a emits an ultrasound measurement signal Se. By way of example, the ultrasound measurement signal is generated from a squarewave signal 4. The second transducer 2b receives an ultrasound signal Sr resulting from the ultrasound measurement signal Se propagating in the fluid.

The measurement module 3 thus estimates a travel time Tab taken by the ultrasound measurement signal Se to travel along the path of defined length from upstream to downstream.

Likewise, the second transducer 2b emits an ultrasound measurement signal that is received by the first transducer 2a. The measurement module 3 thus estimates a travel time Tba taken by the ultrasound measurement signal to travel along the path of defined length from downstream to upstream.

The measurement module 3 then calculates the mean speed $\overline{V}$ of the fluid by using the following formula:

$\Delta T = Tba - Tab = (\overline{V} \cdot 2L)/c^2$, where c is the speed of an ultrasound wave in water. The speed of an ultrasound wave in water is equal to approximately 1500 meters per second (m/s), and it depends on temperature.

Figure 2:
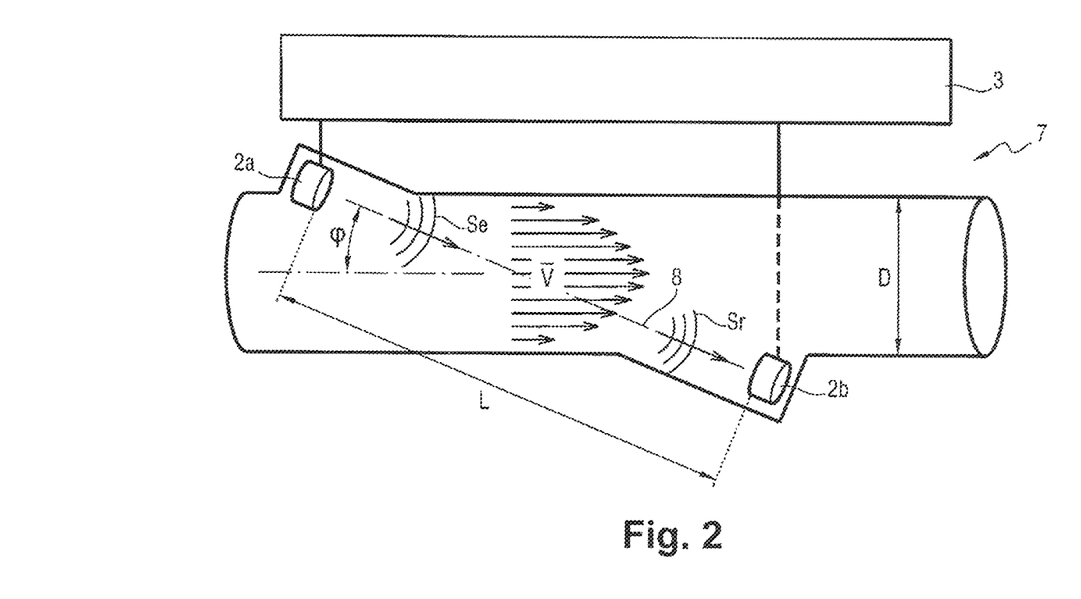
FIG. 2 shows an ultrasonic measuring device of a second type.

A second type of measurement device 7, sometimes referred to as a "free pipe" device, is shown in FIG. 2. The first transducer 2a and the second transducer 2b are now situated on opposite sides of the duct, outside the duct. The second type of measurement device 7 thus presents the advantage of not being intrusive.

The path of defined length is once more a rectilinear path 8 of length L between the first transducer 2a and the second transducer 2b.

The measurement module 3 then calculates the mean speed $\overline{V}$ of the fluid by using the following formula:

$\Delta T = Tba - Tab = (\overline{V} \cdot 2L \cos \varphi)/c^2$.

With the second type of measurement device 7, it is appropriate to have a large value for $\cos \varphi$ and thus an angle $\varphi$ that is very close to 0. It is therefore necessary either to reduce its diameter D of the duct, or else to increase its length L. Reducing the diameter D presents a risk of head loss for the water in the pipe, whereas increasing the length L tends to reduce the signal-to-noise ratio of the measurements as a result of reducing the level of the received ultrasound signal Sr.

Figure 3:
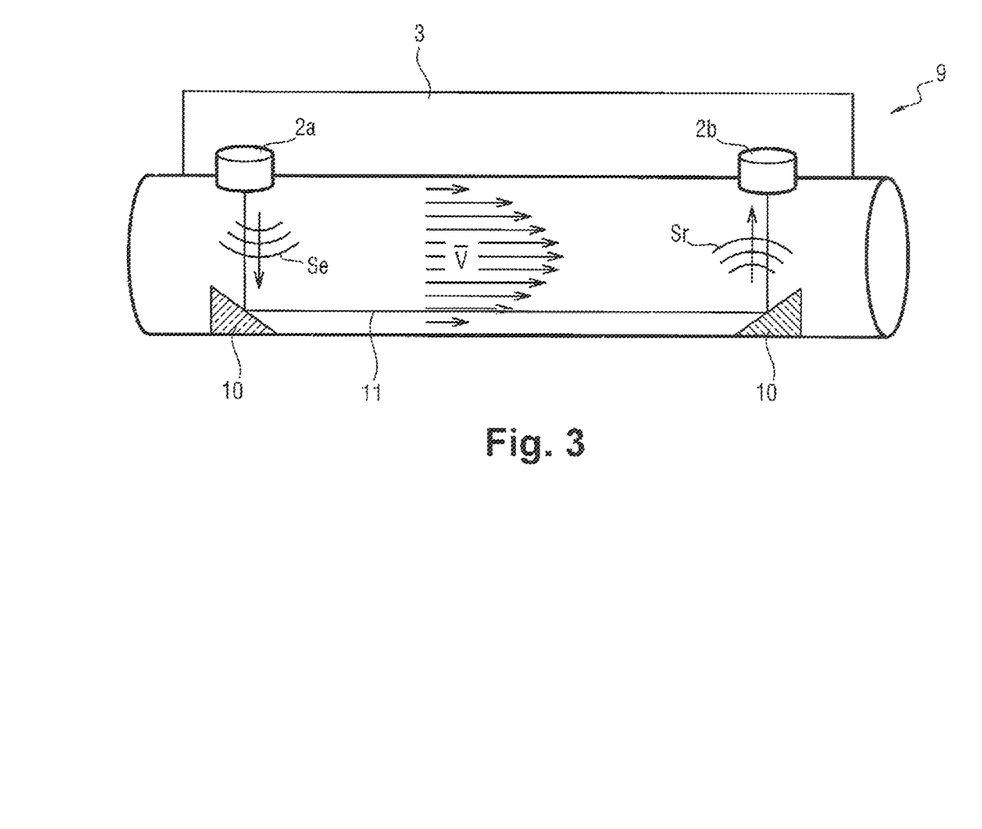
FIG. 3 shows an ultrasonic measuring device of a third type.

A third type of measurement device 9, sometimes referred to as a "U-shape" device, is shown in FIG. 3. The third type of measurement device 9 seeks to solve the above-mentioned drawbacks. The third type of device 9 is a solution that is not very intrusive, making use of reflectors 10 (in this example mirrors angled at 45°) serving to solve the problem of cow.

The path of defined length is a path 11 of U-shape between the first transducer 2a and the second transducer 2b.

It can happen that disturbances P (shown in FIG. 1), e.g. anomalies or attempts at fraud, degrade the operation of the measurement device of a fluid flow meter.

An anomaly is defined herein as being an involuntary phenomenon, e.g. resulting from an operating problem (e.g. in the meter or in the network) or from a fluid flow problem.

An attempt at fraud is defined herein as being a voluntary phenomenon, e.g. performed using an ultrasound generator. An attempt at fraud may be performed from outside the pipe and the duct, but it could also be performed from inside the pipe, e.g. by positioning a waterproof ultrasound generator in a particle filter situated downstream from the meter and close thereto.

OBJECT OF THE INVENTION

An object of the invention is to detect the presence of a disturbance that might degrade the measurements taken in an ultrasonic fluid meter, and to determine whether the disturbance results from an anomaly or from a fraud.

SUMMARY OF THE INVENTION

In order to achieve this object, there is provided a method of measuring the speed of a fluid, the method comprising measurement stages, each comprising the steps of emitting an ultrasound measurement signal, of receiving the ultrasound measurement signal after it has travelled along a path of defined length, and of evaluating the speed of the fluid as a function of the travel time taken by the ultrasound measurement signal to travel along the path of defined length, the measurement method further comprising detection stages that are each performed between two measurement stages, each detection stage comprising the following steps:
  measuring an interfering ultrasound signal level present in the fluid;
  comparing the level of the interfering ultrasound signal with a current value of a detection threshold, the detection threshold being capable of taking a plurality of predefined values lying between a maximum detection threshold and a minimum detection threshold;
  if the measured level of the interfering ultrasound signal is less than the current value of the detection threshold, reducing the current value of the detection threshold, and reiterating the measurement step and the comparison step;

when the measured level of the interfering ultrasound signal becomes greater than or equal to a limit current value of the detection threshold, detecting a disturbance and, as a function of the limit current value of the detection threshold (S_l), determining whether the disturbance comes from an anomaly or from an attempted fraud.

This serves to detect the occurrence of a disturbance, and it is determined whether the disturbance comes from an anomaly or from an attempted fraud.

There is also provided an ultrasound fluid meter comprising a first transducer, a second transducer, and processor means arranged to perform the measurement method as described above.

There is also provided a computer program including instructions for enabling an ultrasound fluid meter to perform the measurement method as described above.

There are also provided storage means that store a computer program including instructions for enabling an ultrasound fluid meter to perform the measurement method as described above.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

The method of the invention for measuring a fluid speed is performed in this example in an ultrasonic water meter.

The ultrasonic water meter comprises both a duct through which there flows water delivered by a distribution network to an installation, and also a water speed measurement device of the kind shown in FIG. 1.

Water flows in the duct from upstream to downstream, as represented by the direction of arrows 10 visible in FIG. 1.

The measurement device comprises a measurement module 3, the first transducer 2a, and the second transducer 2b.

The measurement module 3 comprises processor means including an intelligent processor component adapted to execute instructions of a program for performing the various steps of the measurement method of the invention. In this example, the intelligent component is a microcontroller, but it could be some other component, e.g. a processor or a field programmable gate array (FPGA).

The processor means control the first transducer 2a and the second transducer 2b.

The first transducer 2a and the second transducer 2b are paired. In this example, the first transducer 2a and the second transducer 2b are piezoelectric transducers.

Each of the first and second transducers 2a and 2b performs in succession the function of an ultrasound measurement signal emitter and the function of an ultrasound measurement signal receiver.

The processor means thus provide the emitter with electrical signals that are transformed by the emitter into ultrasound measurement signals. In this example, the electrical signals are squarewave signals 4. The processor means acquire the ultrasound measurement signals Sr received by the receiver.

The emitter emits the ultrasound measurement signals Se at an emission frequency fus. In this example, the frequency fus lies in the range 900 kilohertz (kHz) to 4 megahertz (MHz).

The ultrasound measurement signals Se thus travel from upstream to downstream and from downstream to upstream along a path of defined length L between the first transducer 2a and the second transducer 2b. In this example, the path of defined length is a rectilinear path between the first transducer 2a and the second transducer 2b.

In FIG. 1, the first transducer 2a is shown as performing the function of an emitter, and the second transducer 2b is shown as performing the function of a receiver. The ultrasound measurement signal Se thus follows the path of defined length from upstream to downstream. The ultrasound measurement signal Se is emitted by the emitter at a level NE. The received ultrasound measurement signal Sr is received by the receiver at a level NR that is lower than the level NE. The measurement method of the invention comprises measurement stages that are repeated at regular intervals.

There follows a description of one of these measurement stages.

The processor means produce a travel time measurement representative of the time taken by the ultrasound measurement signal Se to travel along the path of predefined length from upstream to downstream, and then produce a travel time measurement representative of the time taken by the ultrasound measurement signal Se to travel along the path of predefined length from downstream to upstream, and finally they evaluate the speed of the water as a function of those travel times.

Figure 4:
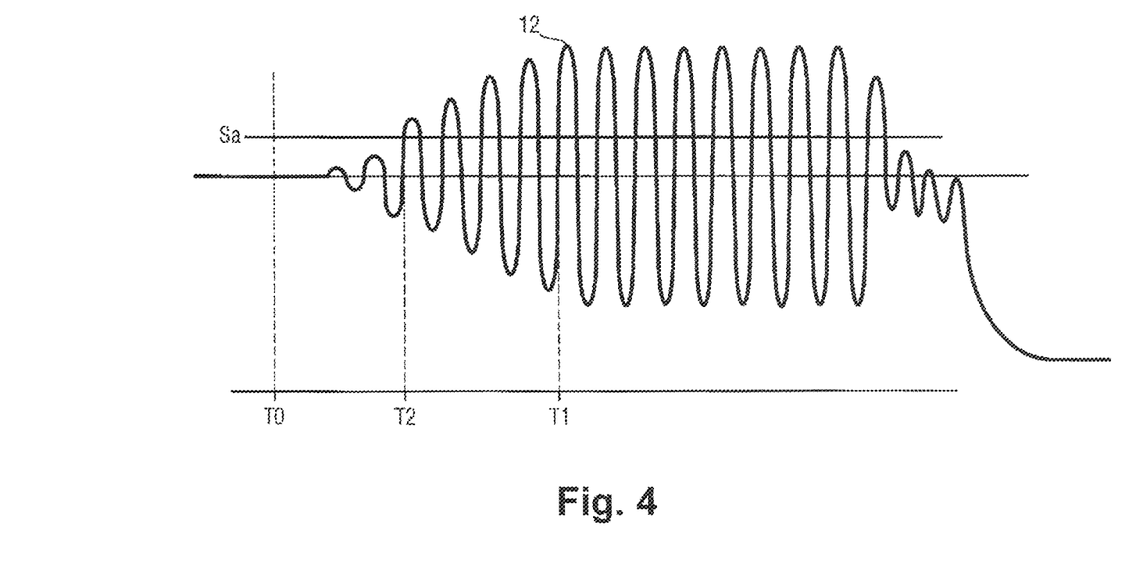
FIG. 4 shows an ultrasound measurement signal received after it has travelled along a path of defined length.

FIG. 4 shows a received ultrasound measurement signal Sr as received by the receiver after it has travelled along the path of defined length.

The receiver activates reception at a moment T0, synchronized with the emission of the ultrasound measurement signal Se. This synchronization is made possible by pairing the emitter and the receiver.

The travel time is measured on the basis of determining a moment of arrival T1 for a predetermined lobe 12 of the received ultrasound measurement signal Sr.

In this example, the moment of arrival T1 is the instant at which a rising front of the predetermined lobe 12 arrives. The moment of arrival T1 is measured by a zero crossing type method.

The predetermined lobe 12 is a $j^{th}$ lobe of the received ultrasound measurement signal Sr after the received ultrasound measurement signal Sr presents an amplitude that exceeds a predetermined amplitude threshold Sa at a time T2. Specifically, in this example the $j^{th}$ lobe is the fourth lobe.

The speed of the water is then evaluated by the measurement module 3 as a function of an upstream to downstream travel time measurement and of a downstream to upstream travel time measurement.

The speed of the water is proportional to a difference between the downstream to upstream travel time measurement and the upstream to downstream travel time measurement.

It should be observed that in this example, the measured speed of the water is an average speed for the water across the diameter of the duct, given that the speeds of masses of water differ from the center of the duct to the proximity of the walls of the duct.

In addition to measurement stages, the measurement method of the invention includes detection stages that serve to detect the occurrence of a disturbance and to determine whether the disturbance comes from an anomaly or from an attempted fraud.

Each detection stage is repeated at regular intervals, which may optionally be periodic, between two measurement stages. A detection stage consists in making the above-mentioned predetermined amplitude threshold Sa programmable in order to detect the presence of a disturbance.

The programmable predetermined amplitude threshold is thus a detection threshold $S\_n$ that can take on a plurality of predefined values lying between a maximum detection threshold S0 and a minimum detection threshold $S\_N-1$. Each of the predefined values of the detection threshold $S\_n$ is referenced by the index n and presents values that decrease with increasing index n.

Figure 5:
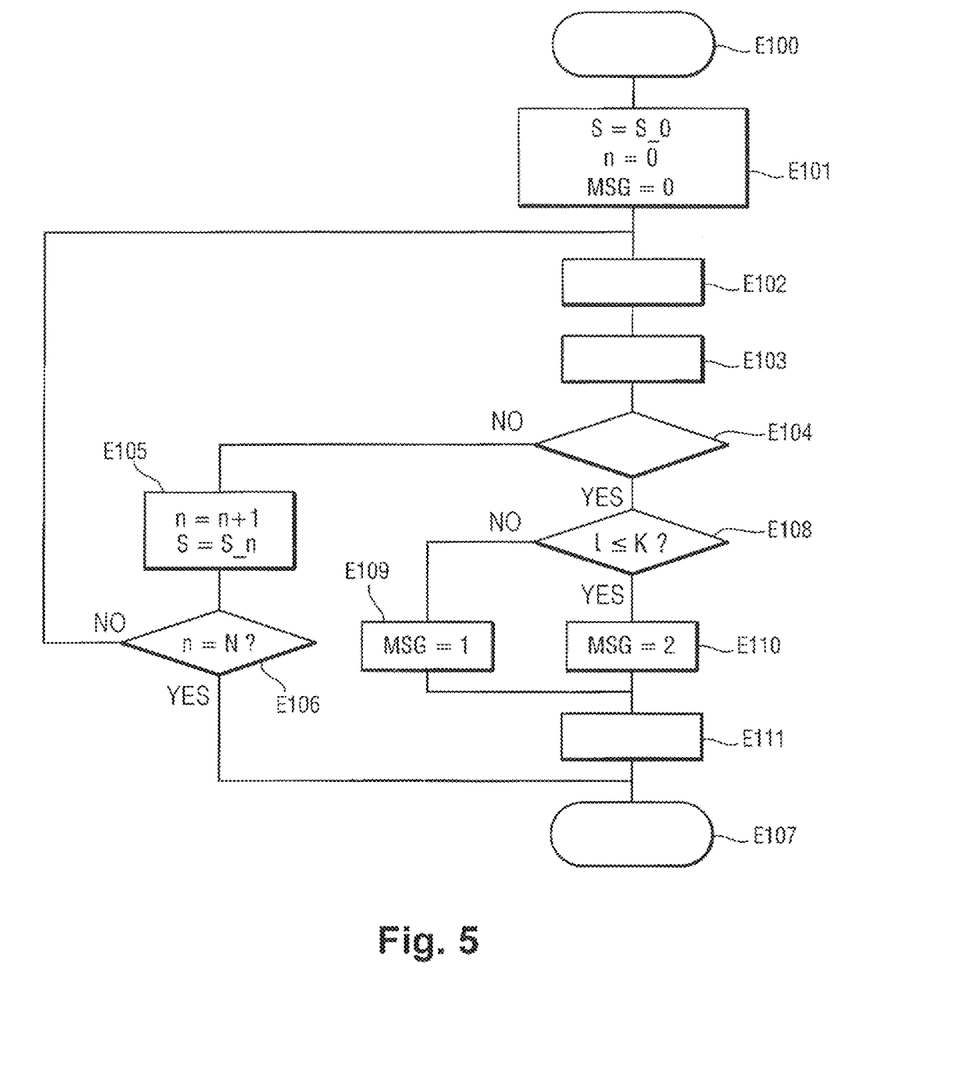
FIG. 5 shows steps of a detection stage of the measurement method of the invention.

With reference to FIG. 5, there follows a description in greater detail of the various steps constituting a detection stage.

Following a starting step (step E100), the detection stage comprises an initialization step (step E101) consisting in initializing the index n to 0, the current value of the detection threshold $S\_n$ to the maximum detection threshold $S\_0$, and a variable MSG to 0. The role of the variable MSG is explained below.

Thereafter, the detection stage comprises a waiting step (step E102) and a measuring step (step E103).

The waiting step is for delaying implementation of the measurement step by a delay time.

The delay time is measured on the basis of a moment when the level of the ultrasound measurement signal generated during a preceding measurement stage has become lower than a predetermined silence threshold.

In this example, the delay time is equal to 15 milliseconds (ms).

The level of the ultrasound measurement signal generated during the preceding measurement stage is measured both by the first transducer 2*a* acting as a receiver and by the second transducer 2*b* acting as a receiver.

Thus, after the delay time, the level of the measured ultrasound signal as generated voluntarily during the preceding measurement stage is almost zero.

Thereafter, the detection stage comprises a step during which the first transducer 2*a* (or indeed the second transducer 2*b*) acts as a receiver (E103).

The receiver acquires the level of the ultrasound signal present in the water while no ultrasound measurement signal is being generated. The processor means then measure this "interfering" sound signal present in the water, and compare the level of the interfering ultrasound signal with the current value of the detection threshold $S\_n$ (step E104). At this moment, the current value of the detection threshold is equal to $S\_0$.

If the level of the interfering ultrasound signal is less than the current value of the detection threshold $S\_n$, then the presence of disturbance is not detected.

The index $\underline{n}$ is incremented: the index $\underline{n}$ becomes equal to 1, and the current value of the detection threshold becomes equal to S1 (step E105).

The index $\underline{n}$ is then compared with the value N (step E106).

If $\underline{n}$ reaches the value N, then the detection stage comes to an end without any disturbance being detected (step E107). Otherwise, the detection stage goes back to step E102.

In contrast, during the step E104, when the level of the measured interfering ultrasound signal becomes greater than or equal to a limit current value of the detection threshold $S\_l$, then a disturbance is detected.

The index $\underline{l}$ of the current limit value of the detection threshold $S\_l$ is then compared with a predefined index threshold K (E108).

If the index $\underline{l}$ of the current limit value of the detection threshold $S\_l$ is greater than the predefined index threshold K, that means that the current limit value of the detection threshold $S\_l$ is relatively small and thus that the level of the interfering ultrasound signal is relatively low. It is deduced therefrom that the disturbance corresponds to an anomaly.

The variable MSG then takes the value 1 (step E109).

In contrast, if the index $\underline{l}$ of the current limit value of the detection threshold $S\_l$ is less than or equal to the predefined index threshold K, that means that the current limit value of the detection threshold $S\_l$ is large and thus that the level of the interfering ultrasound signal is high. It is deduced therefrom that the disturbance corresponds to an attempted fraud.

The variable MSG then takes the value 2 (step E110).

Thereafter, the detection stage has a step of transmitting a warning message that depends on the value of the variable MSG (step E111). If the variable MSG is equal to 1, the warning message is an anomaly message, and if the variable MSG is equal to 2, the message is a fraud message.

The warning message is transferred to an "entity", which may for example be a water supplier, a water network manager, any operator, or a water-consuming client.

The warning message is transmitted by powerline carrier or by any other (wired or wireless) type of communication means. When powerline carrier communication is selected, the DLMS and COSEM application layers are advantageously used.

Under such circumstances, an example warning message may be as follows:
    <EventNotificationRequest>
    <AttributeDescriptor>
    <ClassIdValue="0001"/>
    <InstanceIdValue="0000616200FF"/>
    <AttributeIdValue="02"/>
    </AttributeDescriptor>
    <AttributeValue>
    <DoubleLongUnsignedValue="00000001"/>
    </AttributeValue>
    </EventNotificationRequest>

The encoding associated with the corresponding alarm is: C20000010000616200FF020600000001.

During the detection stage, provision may be made to emit a decoy ultrasound signal, and to attempt to detect a fraudulent ultrasound signal emitted in response to the decoy ultrasound signal. Specifically, there exist very sophisticated ultrasound generators that are capable of being used for fraudulent purposes, that attempt to become synchronized on ultrasound measurement signal emissions in order to disturb them.

In order to counter fraud of that type, a decoy signal is emitted for a short duration, and then once the decoy signal has faded, a check is made to see whether an ultrasound signal is present. Such an ultrasound signal is then a fraudulent ultrasound signal. A warning message (of type MSG=2) is then issued.

It should be observed that it is possible to make provision for adjusting the predefined index threshold K, that serves to distinguish between an anomaly and an attempted fraud. By way of example, the adjustment may depend on the time of day at which the detection stage is performed. It is known that at the end of the day, the water distribution network is heavily used, thereby tending to increase the occurrence of anomalies and the level of interfering ultrasound signals that result from such anomalies. It can therefore be advantageous to lower the predefined index threshold K at the end of the day.

The predefined values $S\_0, \ldots,$ and $S\_N-1$ that can be taken by the detection threshold $S\_n$ can thus be adjustable.

It should also be observed that the entire detection phase need not necessarily be performed in the water meter.

By way of example, it is entirely possible to make provision for measurements of the level of interfering ultrasound signal to be taken in the water meter, and for those measurements to be transmitted to external equipment, e.g. a "cloud" server managed by an entity. For each detection stage, the steps following the measurement step are then performed in the external equipment. The entity may then make use of its own criteria for detecting and evaluating the disturbance. By way of example, the entity may itself define the predefined index threshold K for distinguishing between an anomaly and an attempted fraud.

Naturally, the invention is not limited to the embodiment described, but covers any variant coming within the ambit of the invention as defined by the claims.

The invention is naturally not limited to measuring the speed of water, but applies to any type of fluid (e.g. a gas or oil).

The invention is described above in an ultrasonic water meter comprising a first type of measurement device (classical pipe), however the invention can be performed in any other type of ultrasonic measurement device, and in particular with the second type of measurement device and with the third type of measurement device as described above. It is possible to use any type of path of defined length, with any type of reflector, any type of mirror, etc.

It is stated that each detection stage is performed between two measurement stages. Those measurement stages need not necessarily be successive measurement stages. In general manner, the measurement stages and the detection stages may be repeated, optionally regularly, optionally periodically.

All of the numerical values provided herein are used to illustrate the invention, and they could naturally be different when performing the invention.

The invention claimed is:

1. A method of measuring the speed of a fluid, the method comprising:
    measurement stages, each comprising:
        emitting an ultrasound measurement signal; receiving the ultrasound measurement signal after it has travelled along a path of defined length; and
        evaluating the speed of the fluid as a function of the travel time taken by the ultrasound measurement signal to travel along the path of defined length; and
    detection stages that are each performed between two measurement stages, each detection stage comprising:
        measuring an interfering ultrasound signal level present in the fluid;
        comparing the interfering ultrasound signal level with a current value of a detection threshold, the detection threshold being capable of taking a plurality of predefined values lying between a maximum detection threshold and a minimum detection threshold;
        determining that the measured interfering ultrasound signal level is less than the current value of the detection threshold, reducing the current value of the detection threshold, and reiterating said measuring and said comparing; and
        determining that the measured interfering ultrasound signal level becomes greater than or equal to a limit current value of the detection threshold, detecting a disturbance and, as a function of the limit current value of the detection threshold, determining whether the disturbance comes from an anomaly or from an attempted fraud.

2. The measurement method according to claim 1, wherein each of the predefined values of the detection threshold is referenced by an index presenting values that decrease with increasing index, and
    wherein a disturbance is determined as coming from an anomaly if the index of the limit current value of the detection threshold is greater than a predefined index threshold, and a disturbance is determined as coming from an attempted fraud if the index of the limit current value of the detection threshold is less than or equal to the predefined index threshold.

3. The measurement method according to claim 2, wherein the predefined index threshold is adjustable.

4. The measurement method according to claim 3, wherein the predefined index threshold is adjustable as a function of the time of day at which the detection stage is performed.

5. The measurement method according to claim 1, wherein the detection stage also includes delaying performance of said measuring an interfering ultrasound signal level present in the fluid by a predefined delay time.

6. The measurement method according to claim 5, wherein the predefined delay time is measured on the basis of a moment when a level of the ultrasound measurement signal generated during a preceding measurement stage has become lower than a predetermined silence threshold.

7. A method of measuring the speed of a fluid, the method comprising:
    measurement stages, each comprising:
        emitting an ultrasound measurement signal;
        receiving the ultrasound measurement signal after it has travelled along a path of defined length; and
        evaluating the speed of the fluid as a function of the travel time taken by the ultrasound measurement signal to travel along the path of defined length; and
    detection stages that are each performed between two measurement stages, each detection stage comprising:
        measuring an interfering ultrasound signal level present in the fluid;
        comparing the interfering ultrasound signal level with a current value of a detection threshold, the detection threshold being capable of taking a plurality of predefined values lying between a maximum detection threshold and a minimum detection threshold;

if the measured interfering ultrasound signal level is less than the current value of the detection threshold, reducing the current value of the detection threshold, and reiterating said measuring and said comparing;

when the measured interfering ultrasound signal level becomes greater than or equal to a limit current value of the detection threshold, detecting a disturbance and, as a function of the limit current value of the detection threshold, determining whether the disturbance comes from an anomaly or from an attempted fraud, wherein the detection stage also includes emitting a decoy ultrasound signal, and of attempting to detect a fraudulent ultrasound signal emitted in response to the decoy ultrasound signal.

8. The measurement method according to claim 1, wherein the detection stage also includes transmitting the measured interfering ultrasound signal level to external equipment.

9. The measurement method according to claim 8, wherein the measurement stages and said measuring the interfering ultrasound signal level present in the fluid in each detection stage are performed in an ultrasound fluid meter, and wherein the steps following said measuring an interfering ultrasound signal level present in the fluid of each detection stage are performed in the external equipment.

10. The measurement method according to claim 8, wherein the external equipment is a server in the "cloud".

11. The measurement method according to claim 1, wherein the detection stage also includes transmitting a warning message when a disturbance is detected.

12. The measurement method according to claim 11, wherein the warning message is transmitted by powerline carrier.

13. An ultrasound fluid meter comprising a first transducer, a second transducer, and processor means arranged to perform the measurement method according to claim 1.

14. A non-transitory computer readable storage means that stores a computer program including instructions for enabling an ultrasound fluid meter to perform the measurement method according to claim 1.

* * * * *